United States Patent
Benkreira et al.

(10) Patent No.: US 11,392,900 B2
(45) Date of Patent: Jul. 19, 2022

(54) SYSTEMS AND METHODS FOR CUSTODIAL EMAIL MANAGEMENT AND TRANSACTION VERIFICATION

(71) Applicant: Capital One Services, LLC, McLean, VA (US)

(72) Inventors: Abdelkader Benkreira, Washington, DC (US); Michael Mossoba, Arlington, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/380,096

(22) Filed: Jul. 20, 2021

(65) Prior Publication Data

US 2021/0350328 A1    Nov. 11, 2021

Related U.S. Application Data

(63) Continuation of application No. 16/674,103, filed on Nov. 5, 2019, now Pat. No. 11,087,284, which is a continuation of application No. 16/176,319, filed on Oct. 31, 2018, now Pat. No. 10,510,047.

(51) Int. Cl.
| | |
|---|---|
| *G06F 15/16* | (2006.01) |
| *G06Q 10/10* | (2012.01) |
| *H04L 51/00* | (2022.01) |
| *H04L 51/42* | (2022.01) |

(52) U.S. Cl.
CPC .......... *G06Q 10/107* (2013.01); *H04L 51/12* (2013.01); *H04L 51/22* (2013.01)

(58) Field of Classification Search
CPC ........ G06Q 10/107; H04L 51/12; H04L 51/22
See application file for complete search history.

(56) References Cited

U.S. PATENT DOCUMENTS

| | | | |
|---|---|---|---|
| 5,963,915 A | 10/1999 | Kirsch | |
| 7,502,828 B2* | 3/2009 | Gardner | ................ H04L 51/12 709/206 |
| 9,202,186 B2 | 12/2015 | Wellman et al. | |
| 9,202,218 B1 | 12/2015 | Crisman et al. | |
| 9,430,652 B1 | 8/2016 | Mattsson et al. | |
| 2009/0204032 A1 | 8/2009 | Herrmann et al. | |
| 2012/0204032 A1 | 8/2012 | Wilkins et al. | |
| 2012/0331126 A1 | 12/2012 | Abdul-Razzak et al. | |
| 2015/0215241 A1* | 7/2015 | Zhou | ...................... H04L 51/16 709/206 |
| 2017/0019396 A1 | 1/2017 | Bettenburg et al. | |

(Continued)

*Primary Examiner* — Richard G Keehn
(74) *Attorney, Agent, or Firm* — Troutman Pepper Hamilton Sanders LLP; Christopher J. Forstner; John A. Morrissett

(57) ABSTRACT

A proxy email account management system configured to identify emails comprising receipt information and match the identified emails to respective transactions. The proxy email account management system may comprise a custodial email management system associated with a proxy email address. The custodial email management system may parse emails for receipt information and account-holder information, identify receipt information and account-holder information, determine if the emails correspond to a purchase made by an account-holder, and forward the email to a primary email address associated with the account-holder.

20 Claims, 6 Drawing Sheets

(56) References Cited

U.S. PATENT DOCUMENTS

2017/0103392 A1*  4/2017  Moore .................. G06Q 20/385
2018/0225673 A1*  8/2018  Dubey .................. G06Q 10/10
2018/0350180 A1  12/2018  Onischuk

* cited by examiner

SYSTEMS AND METHODS FOR CUSTODIAL EMAIL MANAGEMENT AND TRANSACTION VERIFICATION

CROSS REFERENCE TO RELATED APPLICATIONS

This application is a continuation of, and claims priority under 35 U.S.C. § 120 to, U.S. patent application Ser. No. 16/674,103, filed Nov. 5, 2019, which is a continuation of U.S. patent application Ser. No. 16/176,319, now U.S. Pat. No. 10,510,047, filed Oct. 31, 2018, the entire contents of each of which is incorporated fully herein by reference.

TECHNICAL FIELD

The present disclosure relates to systems and methods for custodial email management and transaction verification, and, in particular to proxy email account management systems that can identify emails comprising receipt information and match the identified emails to respective transactions.

BACKGROUND

E-commerce merchants often require customers to enter personal information when making a purchase, usually for the immediate purpose of sending an electronic copy of the receipt to the customer. However, these merchants often store customer email addresses for sending future advertisements and promotional information. This can result in customers receiving a variety of un-wanted emails that clutter their inbox. Further, there are significant security concerns with customer information being stored on merchant platforms, including security breaches, which might result in customer information (e.g., personal and financial information) being stolen.

Accordingly, there is a need for systems and methods for custodial email management. Embodiments of the present disclosure are directed to this and other considerations.

SUMMARY

Disclosed embodiments provide systems and methods for custodial email management and transaction verification.

In some embodiments, systems and methods for custodial email management and transaction verification can comprise at least one processor and at least one memory having stored thereon computer program code. The computer program code, when executed by the at least one processor, can control the system to receive data indicative of a first email from a first merchant. The data indicative of the first email can be directed to a proxy email address and the proxy email address can correspond to a plurality of account-holders. The computer program code can control the system to parse the data indicative of the first email for receipt information and account-holder information and identify receipt information and account-holder information from within the data indicative of the first email. The computer program code can control the system to send a forward email to a primary email address associated with a first account-holder among the plurality of account-holders. The forward email can comprise data indicative of the first email, and the forward email may be sent in response to determining that the data indicative of the first email includes receipt information associated with a first purchase made with the first merchant and account-holder information associated with the first account-holder.

In some embodiments, the computer program code can further control the at least one processor to receive, from the first merchant, data indicative of a second email directed to the proxy email address, determine that the second email does not include receipt information by parsing the data indicative of the second email for receipt information, and discard the data representative of the second email.

In some embodiments, the computer program code can further control the at least one processor to receive a plurality of emails from a plurality of merchants, each of the plurality of emails being intended for a respective account-holder of the plurality of account-holders.

In some embodiments, the computer program code can further control the at least one processor to send the receipt information to a transaction server, the transaction server storing transaction data associated with a plurality of transactions corresponding to the plurality of purchases and configured to store the receipt information in association with a first transaction of the plurality of transactions corresponding to the first purchase.

In some embodiments, the computer program code can further control the at least one processor to parse the data indicative of the first email to identify, as the receipt information, one or more of a merchant name, a merchant code, a transaction time and date, a total transaction amount, a subtotal amount, discounts provided, a shipping and handling cost, a one or more product names, one or more product descriptions, one or more product sizes, one or more product customizations, one or more product quantities, one or more product prices, one or more services rendered, a gratuity, and tax information.

In some embodiments, the computer program code can further control the at least one processor to parse the data indicative of the first email to identify, as the account-holder information, one or more of an address, a name, a card number, a partial card number, an expiration date for a card, a security code, an account number, a rewards or loyalty program number, or a phone number associated with an account-holder of the plurality of account holders.

In some embodiments, the computer program code can further control the at least one processor to: determine, from within the receipt information, one or more receipt line items associated with the first purchase, the one or more receipt line items comprising a service rendered, a product name, a product quantity, and a product price; determine, from within the receipt information, a receipt total representative of a total amount spent associated with the first purchase; and verify the one or more receipt line items by comparing an aggregate price of the one or more receipt line items with the receipt total.

Embodiments of the present disclosure can comprise a system for matching receipt information to transaction information comprising: at least one processor; and at least one memory having stored thereon computer program code that, when executed by the at least one processor, controls the at least one processor to: receive transaction data associated with a plurality of transactions from a plurality of accounts; receive a query request from an email server, the query request comprising receipt data associated with a first purchase made at a first merchant; and attach, in response to identifying a transaction among the plurality of transactions corresponding to the first purchase by comparing the receipt data with the transaction data, the receipt data to the identified transaction.

In some embodiments, the receipt data associated with the first purchase can comprise a plurality of receipt line items.

In some embodiments, the computer program code can further control the at least one processor to: separate each line item from the plurality of line items received from the email server; and store each line item as a separately identifiable entry and in connection with the identified transaction of the plurality of transactions.

In some embodiments, the computer program code can further control the at least one processor to: conduct an initial comparison of the transaction data to the receipt data to identify a transaction among the plurality of transactions corresponding to the first purchase; receive an update to the transaction data, the update comprising transaction data associated with at least one transaction from the plurality of accounts; and in response to the initial comparison failing to identify a transaction among the plurality of transactions corresponding to the first purchase, conduct an updated comparison of the updated transaction data to the receipt data to identify a transaction corresponding to the first purchase.

In some embodiments, the computer program code can further control the at least one processor to discard the receipt data in response to failing to identify a transaction among the plurality of transactions that corresponds to the first purchase after a predetermined number of comparisons to further updated transaction data.

In some embodiments, the computer program code can further control the at least one processor to output for transmission, data in response to failing to identify a transaction among the plurality of transactions that corresponds to the first purchase after a predetermined number of comparisons to further updated transaction data, a notification to the email server indicating that the transaction could not be found.

In some embodiments, the computer program code can further control the at least one processor to: receive image data representative of a first email corresponding to the first transaction; and store the image data in connection with the identified transaction.

In some embodiments, the computer program code can further control the at least one processor to: determine, from the receipt data, one or more of a merchant name, a merchant address, a transaction time and date, and a total transaction amount; and identify a transaction among the plurality of transactions corresponding to the first purchase by matching one or more of a merchant code, a time-stamp, and a total transaction amount corresponding to the transaction with the corresponding determined one or more of the merchant name, merchant address, transaction time and date, and total transaction amount from the receipt data.

Embodiments of the present disclosure can comprise a custodial email management system comprising: at least one processor; and at least one memory having stored thereon computer program code that, when executed by the at least one processor, controls the at least one processor to: receive, from a first merchant, a first email addressed to a proxy email address, the proxy email address corresponding to a first account-holder; determine, based on the first email, whether the first email includes receipt information; in response to determining that the first email includes the receipt information, determine whether the receipt information corresponds to a transaction of a plurality of transactions of the first account-holder; and forward, in response to determining that the first email includes receipt information and corresponds to a transaction of the plurality of transactions, the first email to a primary email address associated with the first account holder.

In some embodiments, the computer program code can further control the at least one processor to: identify one or more receipt line items associated with the receipt information; and send the one or more receipt line items to a transaction server, the transaction server storing transaction data associated with the plurality of transactions and configured to store the receipt line items in association with the transaction of the plurality of transactions corresponding to the receipt information.

In some embodiments, the computer program code can further control the at least one processor to: in response to determining that the first email includes the receipt information, transmit the receipt information to a transaction server storing transaction data associated with the plurality of transactions of the first account-holder; receive a notification from the transaction server indicating that a transaction of the plurality of transactions corresponding to the receipt information was not identified; and discard, in response to receiving the notification, the first email.

In some embodiments, the computer program code can further control the at least one processor to determine whether the first email includes receipt information by parsing the first email to identify one or more contextual clues corresponding to receipt information.

In some embodiments, the computer program code can further control the at least one processor to discard, in response to determining that the first email does not include receipt information, the first email.

Further features of the disclosed system and methods, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various non-limiting implementations and aspects of the disclosed technology and, together with the description, serve to explain the principles of the disclosed technology. In the drawings.

DETAILED DESCRIPTION

Figure 1:
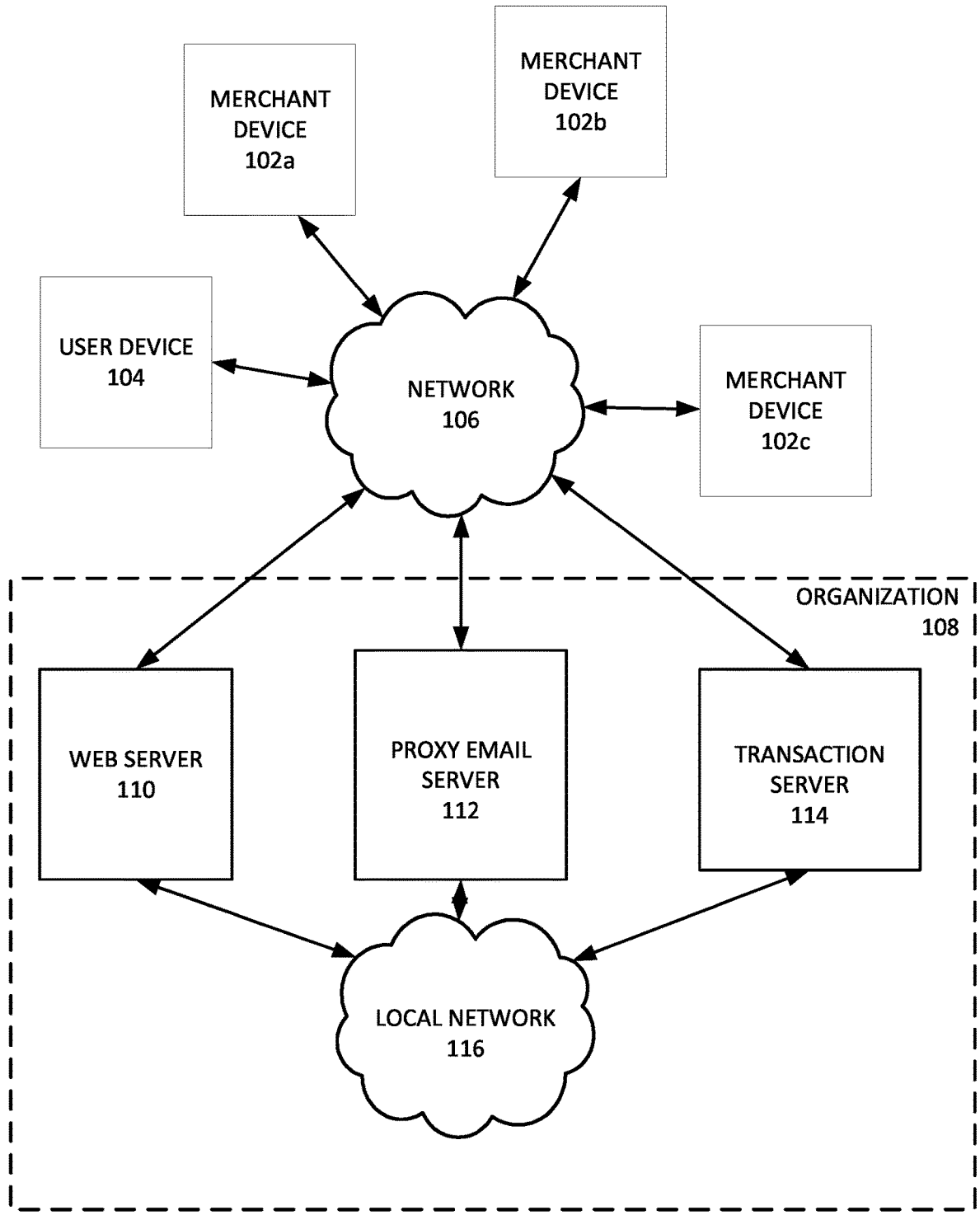
FIG. 1 is a diagram of an exemplary environment that may be used for custodial email management and transaction verification.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the disclosed technology may facilitate custodial email management and transaction verification. For example, embodiments of the disclosed technology can allow a third-party organization (e.g., a financial institution) to provide a proxy email address to account-holders for use at merchants engaging in e-commerce (e.g., merchants using point of sale (POS) devices). The proxy email address may correspond to an account associated with the third-party organization and be provided to limit entry (and distribution) of an account-holder's personal email address. This can be advantageous in the event of a data breach because the merchant device will no longer store the account-holder's personal email address. Various embodiments of the disclosed technology may facilitate custodial email management by a third party for all users associated with the third party. For example, embodiments of the disclosed technology can allow a financial institution to provide proxy email addresses to all users having an account with the financial institution. Various embodiments of the disclosed technology may even permit large-scale email management of multiple account-holders at once. For example, embodiments of the disclosed technology can allow a financial institution to provide a single email address to all (or a plurality of) users having an account with the financial institution. Various embodiments of the disclosed technology may incorporate auto-filtering of unwanted junk or spam emails received from merchants. This may provide numerous technical advantages, such as reducing data transfer to mobile devices over the network by decreasing the amount of unneeded messages (e.g., junk or spam) sent to mobile devices. Various embodiments of the disclosed technology may allow for identification and storage of receipt line items for easy access and display for account-holders. For example, certain embodiments of the disclosed technology can allow for data parsing of received emails for receipt line items and storing of receipt line items as separate entries in an account-holder's transaction history. This may increase the accessibility of receipt information (e.g., identifying and searching of specific products purchased instead of total amount spent when viewing transaction history or banking statements online).

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary environment for custodial email management and transaction verification 100 that may be configured to perform one or more processes that permit receiving receipts corresponding to a variety of purchase made at merchant devices engaging in e-commerce, managing receipts received from merchants and corresponding to a variety of purchases, matching receipt information to transactions, and storing receipt information associated with the identified transaction. The components and arrangements shown in FIG. 1 are not intended to limit the disclosed embodiments as the components used to implement the disclosed processes and features may vary. The presently disclosed systems and methods can be advantageous because, as non-limiting examples, they can serve the dual purpose of protecting account-holders making purchases at merchants engaging in e-commerce by providing a proxy email account while increasing the amount of data available to account-holders regarding transaction data As illustrated at FIG. 1, custodial email management system 100 may include a plurality of merchant devices 102a, 102b, 102c in communication with various devices in organization 108, including web server 110, proxy email server 112, and transaction server 114. Merchant devices 102a, 102b, 102c may communicate with web server 110, proxy email server 112, and transaction server 114 over network 106. Web server 110, proxy email server 112, and transaction server 114 may communicate with one-another over local network 116 and may include one or more servers, routers, data servers, or other computer-based systems. Web server 110, proxy email server 112, and transaction server 114 may also communicate with user device 104 over network 106. As such, FIG. 1 illustrates exemplary information flow between devices for communication between an entity, such as a financial services provider, and users affiliated with the financial services provider accessing merchant devices (e.g., devices through which one or more purchases can be made). While FIG. 1 shows merchant devices 102a, 102b, 102c, such devices are intended to be exemplary and it is contemplated that systems for custodial email management system 100 may comprise more or less merchant devices than those illustrated in FIG. 1.

Merchant devices 102a, 102b, 102c may include any devices which facilitate making an e-commerce transaction. In some embodiments, one or more of merchant devices 102a, 102b, 102c may be mobile point-of-sale (POS) terminals. Mobile POS terminals may include any device for facilitating e-commerce transactions, including Spark Pay, Square, PayPal Here, or Intuit® GoPayment, which upon completion of purchases may prompt a customer for their email-address. In some embodiments, one or more of merchant devices 102a, 102b, 102c may be a mobile device (e.g., a smartphone, a tablet computer, a portable laptop computer, a gaming console, a smart TV, a virtual assistant, a wearable device, a desktop computer, or other computing device) configured with a mobile application. In some embodiments the mobile application may comprise a payment interface in which a user may input payment information, such as credit card information, user address, or email address. In some embodiments, one or more of merchant devices 102a, 102b, 102c may be a computing device accessing the web. For instance, in some embodiments, the computing device may access a merchant website and initiate payment via a payment portal of the website. While making a payment, an account-holder may input payment information, such as credit card information, a user address, or email address.

Merchant devices 102a, 102b, 102c may be configured to receive one or more customer inputs (such as an email address). In some cases, a customer may input a proxy email address associated with proxy email server 112 of organization 108 (e.g., a third-party organization such as a financial institution). In some embodiments, the proxy email address may be an email address assigned to one or more account-holders by organization 108. Therefore, in some cases, each account-holder having a bank account with financial institution may have an assigned proxy email address. In some embodiments, the proxy email address may be associated with groups of two or more account-holders affiliated with the financial institution. In other embodiments, a single proxy email address may be associated with all account-holders affiliated with the financial institution.

A customer accessing one or more of merchant devices 102a, 102b, 102c may manually enter the proxy email address. For instance, an account-holder may make a purchase at a mobile POS terminal and, once the transaction is complete, the mobile POS terminal may prompt account-holder to enter an email address to receive a receipt. Account-holder may then manually enter the proxy email address.

In other embodiments, one or more of merchant devices 102a, 102b, 102c, may be configured to automatically enter the proxy email address. For instance, one or more of merchant devices 102a, 102b, 102c may be enabled with one or more software extensions (e.g., a browser extension, an add-on, or a plug-in) that recognize that the user is an account-holder with a third-party organization and automatically enter the proxy email address after account-holder enters payment information. For instance, the software extension may recognize that the account-holder is inputting payment with a credit card associated with a particular financial institution and automatically input the proxy email address upon recognizing the credit card information. The software extension may cause one or more of merchant devices 102a, 102b, 102c to authenticate the card number by contacting the financial institution and requesting the proxy email address. For instance, the software extension may use an issuer identification number or bank identification number (e.g., the first 6 numbers of a credit card number) of the card to identify an issuing institution (e.g., bank). The software extension may query (e.g., through a web service) a database storing a list of issuing organizations and respective issuer identification numbers or bank identification numbers. The software extension may identify the proxy email address upon recognizing the financial institution (e.g., the proxy email address is associated with a particular financial institution).

In some embodiments, the proxy email address may be stored in the memory of the merchant device. In some embodiments, the proxy email address could be generated by or for the merchant device in response to stored instructions. For instance, the proxy email address may be assigned based on one or more of a randomly generated account name and/or a rule-based account name (e.g., the last four digits of the card associated with the account and/or include the account-holder's name). In some embodiments, the merchant device may query a backend server to collect the proxy email address. For instance, the backend server may be associated with the financial institution.

In some embodiments, upon receiving the proxy email address, one or more of merchant devices 102a, 102b, 102c may cache the proxy email address in association with the card number for future purchases.

In some embodiments, one or more of the merchant devices 102a, 102b, 102c may be configured to automatically generate (or have generated) an email message with input fields for automatically inputting receipt information when a transaction is made. In some embodiments, receipt information may include one or more of a merchant name, a merchant code, a transaction time and date, a total transaction amount, a subtotal amount, discount providing, a shipping and handling cost, one or more product names, one or more product quantities, one or more product prices, one or more product descriptions, one or more product sizes, one or more product customizations, one or more services rendered, gratuity, tax information, form of payment, amount of payment, and payment provider. The one or more merchant devices 102a, 102b, 102c may then send the structured receipt information to one or more of proxy email server 112 (e.g., as an email message). In some implementations, merchant devices 102a, 102b, 102c may communicate with transaction server 114 directly, and communicate structured data indicative of receipt information to transaction server 114. The transaction server 114 may then generate a receipt e-mail and send the same to the user device 104.

Proxy email server 112 may communicate with merchant devices 102a, 102b, 102c. Proxy email server 112 may receive data indicative of a plurality of emails from one or more of merchant devices 102a, 102b, 102c. In some embodiments, the data indicative of the plurality of emails may include one or more of a sender address, a recipient address, a send time, a receipt time, and text data corresponding to the body and subject of the email. Proxy email server 112 may comprise one or more physical or virtual servers for processing emails and acting on them. In some embodiments, proxy email server 112 may comprise a plurality of servers that may operate in parallel and/or in conjunction to enhance processing time and conserver memory for a plurality of users.

In some embodiments, proxy email server 112 may be associated with a domain and emails received from devices 102a, 102b, 102c may be directed to proxy e-mail addresses of the domain. In some embodiments, the domain may be owned by a third-party organization to which a user has an account. The proxy email addresses are not a user's personal, work, or primary email address. For instance, in some embodiments, the organization may be a financial services institution and the user may have a bank account with the financial services institution.

In some embodiments, proxy email server 112 may support a single email account associated with the domain. Therefore, proxy email server 112 may receive emails from merchant devices 102a, 102b, 102c directed to a single proxy email address. For instance, each account-holder associated with an organization may use the same proxy email address when making purchases. Thus, proxy email server 112 may receive emails from a plurality of merchants all directed to a same email account, and the emails may correspond to various account-holders. In other embodiments, proxy email server 112 may support multiple email addresses associated with the domain. For instance, account-holders may have an individualized proxy email address or sub-groups of account-holders associated with an organization may use the same proxy email address when making purchases.

Proxy email server 112 may be configured to parse the data indicative of the plurality of emails for receipt information. In some embodiments, parsing the data indicative of the plurality of emails may comprise parsing each respective email for one or more context clues indicative of receipt data. In some embodiments, the one or more context clues may include information unique to receipts, including but not limited to, one or more words or phrases (e.g., "Tax," "Sub-total," or "Total," "Thank You," "Your Purchase"), one or more receipt layouts or formats, or other receipt information, as discussed in more detail below. In some embodiments, the one or more context clues may be certain characters (e.g., dollar signs) or spacing indicating line items. In some embodiments, parsing may include analyzing email text using one or more of natural language processing, optical-character recognition, html scrapers, image recognition, or machine-learning.

The data indicative of the plurality of emails may include receipt information (e.g., the email may document a transaction between an account-holder and the merchant) or non-receipt information (e.g., marketing or promotional emails, junk emails, or spam emails). In some embodiments, a subset of the plurality of emails received from merchant devices 102a, 102b, 102c may include receipt information and account-holder information. In some embodiments, receipt information may include one or more of a merchant name, a transaction time, a total transaction amount, a subtotal transaction amount, one or more product names, one or more product quantities, one or more product prices, and tax information. In some embodiments, account-holder information may include one or more of an address, a name, a card number, an account number, a virtual account number, a routing number, or a phone number associated with an account-holder of the plurality of account holders, a partial card number, an expiration date for a card, a security code, an account number, and a rewards or loyalty program number. In some embodiments, the card number may be a portion of the digits (e.g., the last four digits) of a credit card number, debit card number, account number, or virtual account number associated with the account-holder.

Proxy email server 112 may parse the data indicative of an email received from one or more of merchant devices 102a, 102b, 102c for merchant information to determine if the email contains receipt information. For instance, proxy email server 112 may parse email data to identify receipt information, such as a merchant name corresponding to a merchant at which a purchase was made (e.g., a merchant name may correspond to a merchant from which the email was received). In some embodiments, the merchant name may be obtained from the sender's receipt information. In other embodiments, the merchant name may be obtained from the header of the email (e.g., in the "from" or subject line fields).

Proxy email server 112 may parse the data indicative of an email received from one or more of merchant devices 102a, 102b, 102c for a transaction time. The transaction time may correspond to the time and date on which the transaction was made. In some embodiments, the transaction time may be ascertained from the receipt information itself. In other embodiments, if the transaction time is not included in the receipt information, proxy email server 112 may estimate a transaction time based on a timestamp within the email (e.g., a time/date sent field of an email header).

Proxy email server 112 may parse the data indicative of an email received from one or more of merchant devices 102a, 102b, 102c for a total transaction amount. The total transaction amount may include one or more of a purchase subtotal, sales tax, shipping and handling, and a tip applied to the purchase. In some embodiments, the total amount may be identified based on one or more context clues. For instance, proxy email server 112 may store computer code controlling proxy email server 112 to parse the data indicative of the email for the word "Total," for the words "Subtotal" and "Tax," for the phrase "Your payment of," or for a summation line.

Proxy email server 112 may parse the data indicative of an email received from one or more of merchant devices 102a, 102b, 102c for a subtotal transaction amount. The subtotal transaction amount may include the purchase total before the addition of one or more of tip, tax, shipping and handling charges, and any modifications to the final cost based on discounts such as coupons. In some embodiments, the subtotal amount may be identified based on one or more context clues. For instance, proxy email server 112 may store computer code controlling the proxy email server 112 to parse the data indicative of the email for the word "Subtotal" or "Sub-total."

Proxy email server 112 may parse the data indicative of an email received from one or more of merchant devices 102a, 102b, 102c for one or more goods or services purchased at the merchant device for one or more of a product name, a product description, a product price, a product size, a product identifier (such as an SKU code), customizations to a product, or a product quantity. In some embodiments, as discussed in more detail below, proxy email server 112 may extract the one or more of a product name, a product description, a product price, a product size, a product identifier (such as an SKU code), customizations to a product, and/or a product quantity as one or more receipt line items.

Proxy email server 112 may parse the data indicative of an email received from one or more of merchant devices 102a, 102b, 102c for tax information. The tax information may include an amount of federal, state, and/or local taxes applied to the purchase. In some embodiments, the tax information may be identified based on one or more contextual clues including words (e.g., "Tax") or characters (e.g., a percent sign or percentage amount). For instance, proxy email server 112 may store computer code controlling the proxy email server 112 to parse the data indicative of the email for the word "Tax" or identify a value below a subtotal amount. For instance, proxy email server 112 may store computer code controlling the proxy email server 112 to reverse engineer a line item based analysis of the receipt information. For instance, if proxy email server 112 identifies a line item that says 5% and a subtotal was calculated as $100, proxy email server 112 could calculate the value of the line item as $5 as the tax line item.

Proxy email server 112 may parse the data indicative of an email received from one or more of merchant devices 102a, 102b, 102c for account-holder information. In some embodiments, the account-holder information may be identified by parsing, by proxy email server 112, the data indicative of the email for an account-holder name or address, or by parsing the data indicative of the email for the last 4 digits of a card number (or any other card information provided) to identify an account-holder. For example, a name in a greeting of the email data or a delivery address.

In some embodiments, the data indicative of an email received from one or more of merchant devices 102a, 102b, 102c may comprise structured data wherein the data follows a pre-defined data model. For instance, in some embodiments, the one or more email messages sent from merchant devices 102a, 102b, 102c may follow a template with auto-generated or predefined fields comprising the receipt information. In some cases, the template may be a pre-defined data-structure or table structure with designated locations or tags for various receipt information. In some embodiments, transaction server 114 may send templated information (e.g., through emails or API calls) to the proxy email server 112, which may generate a receipt email based on the templated information, and then send the receipt email to the account-holder.

In some embodiments, the data indicative of an email received from one or more of merchant devices 102*a*, 102*b*, 102*c* may comprise unstructured data that not follow a pre-defined data model or is not organized in a pre-defined manner (e.g., in a manner agreed upon by the proxy email server 112 and the merchant devices 102*a*, 102*b*, 102*c*). In some embodiments, the proxy email server 112 may employ various techniques for determining if the data indicative of the email comprises receipt information. For instance, the proxy email server 112 may engage in data mining, natural language processing, or text analytics to identify receipt information. In some embodiments, the proxy email server 112 may use machine-learning and/or use one or more patterns observed to identify emails containing receipt information. In some embodiments, the proxy email server 112 may identify a general receipt layout using machine learning or machine learning algorithms trained with one or more receipt email patterns.

In some embodiments, after determining that an email includes receipt information, proxy email server 112 may be configured to extract the receipt information and send the receipt information to transaction server 114. In some embodiments, proxy email server 112 may identify particular receipt information using a machine learning algorithm, and extract the identified information using, as non-limiting examples, one or more of optical-character recognition, html scraper, image recognition, or text parsing. The machine learning algorithm may be trained with one or more details about electronic receipts including but not limited to receipt context clues associating certain receipt elements or a receipt layout or structure. For instance, the one or more context clues may include common words or phrases used on receipts such as "Total," "Tax," "Subtotal," "Thank you," "Your purchase," or "Your order," or common arrangements of receipt elements, such as single lines including a product name, product, price, and a product quantity.

In some embodiments, proxy email server 112 may send a query request comprising the receipt information to transaction server 114. The query request may ask transaction server 114 if transaction server 114 has stored a transaction matching the receipt information. The receipt information may include one or more of an account-holder name, an account-holder address, a purchase instrument (e.g., identification of a credit card or the last four digits of a purchasing credit card), a purchase date, a merchant ID, a merchant name, a merchant address, and a purchase total. In some embodiments, the receipt information may be sent to transaction server 114 including one or more receipt line items. In some embodiments, the receipt line items may include a product name (e.g., a description identifying the good or service purchased), a product description, a product size, a product identifier (such as an SKU code), customizations to a product, and a product price. In other embodiments, proxy email server 112 may send the receipt information to transaction server 114 as an image or text file. The image or text file may display the receipt information as shown in the email received from a respective merchant device. In some embodiments, the image file may be a PDF file of the email or a portion of the email received from the merchant device. In some embodiments, proxy email server 112 may comprise multiple physical or virtual servers, and, for example, transaction management and receipt line item identification may be handled by separates servers. This distributed processing can help conserve memory, increase efficiency, and decrease overall processing time associated with proxy email server 112.

Transaction server 114 may receive transaction data from one or more of merchant devices 102*a*, 102*b*, 102*c* associated with purchases made at one or more merchants (e.g., retailers) associated with the one or more of merchant devices 102*a*, 102*b*, 102*c*. In some embodiments, the transaction data may comprise an account number of an account-holder, a transaction amount, a timestamp (e.g., transaction time), and a merchant code associated with the merchant. In some embodiments, transaction server 114 may then store the transaction information in a transaction database.

Transaction server 114 may receive a query request from proxy email server 112, the query request may include receipt data corresponding to at least a portion of the receipt information identified by proxy email server 112. Upon receiving the receipt data, transaction server 114 may then search the transaction database to identify a transaction (e.g., a first purchase) that matches the receipt data. In some embodiments, transaction server 114 may conduct an initial comparison of the transaction data to the receipt data to identify a transaction among the plurality of transactions corresponding to the first purchase. In some embodiments, the initial comparison may include searching the transaction database for a merchant name, a transaction time, and a total transaction amount corresponding to a matching transaction in the transaction database. The merchant name, transaction time, and total transaction amount may be obtained from the receipt information and may be matched with one or more of a merchant code, a time-stamp, and a total transaction amount corresponding to the transaction. In some cases, the merchant code may first be matched to a merchant name (e.g., by accessing a merchant database), and the receipt data may be matched transaction based at least in part on the merchant name. In some embodiments, the transaction data may have sorted or organized transactions and only transactions matching a first portion of receipt data may be analyzed to determine if they further match a second portion. For example, in some embodiments, transaction server 114 may organize transaction data first by merchant, then by date, then by total amount. In some embodiments, the query request may comprise additional information about the merchant device 102*a*, 102*b*, 102*c* from which the data indicative of the email was received, including but not limited to an IP address, a MAC address, a serial number, GPS data, geo-location data, merchant location, or other device information. In some cases, transaction data may also include such device information, and the receipt data can be matched to the transaction data using this device information. In some embodiments, transaction server 114 may receive the device information as part of the transaction data (e.g., either concurrently therewith or as part of the same data package) or in response to a query from transaction server 114 to one or more of merchant devices 102*a*, 102*b*, 102*c* sent after receiving the transaction data. In some embodiments, the merchant location may be determined using the merchant code and identifying a merchant location associated the merchant code (e.g., in a merchant database).

Web server 110 may store, process, and deliver web page information to account-holders. In some embodiments, web server 110 may store one or more instructions for storing, processing, and delivery of web page information to a user device 104 used by an account-holder. In some embodiments, the web page information may comprise an account-holder portal through which account-holders can view transaction history. The transaction history may comprise a plurality of transactions made by the account-holder with a plurality of merchants. Web server 110 may be in communication with transaction server 114 and/or email server 112. In some embodiments, receipt information matched to particular transactions may be stored as part of the transaction history. For instance, the receipt information may be displayed to an account-holder accessing the web as an expandable list showing a plurality of receipt line items purchased at a merchant. In other embodiments, the receipt information may be attached as an image file or text file displaying an electronic copy of the receipt data.

Network 106 may be of any suitable type, including individual connections via the internet, such as cellular or WiFi™ networks. In some embodiments, network 106 may connect merchant devices (102a, 102b, 102c) with devices operating in organization 108 such as web server 110, email server 112, and transaction server 114 using direct connections such as radio-frequency identification (RFID), near-field communication (NFC), Bluetooth™, Bluetooth™ low-energy (BLE) (e.g., BLE mesh and/or thread), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Local network 116 may have some or all of the features of network 106. In some embodiments, local network 116 may connect devices operating in organization 108 such as web server 110, email server 112, and transaction 114.

One of ordinary skill will recognize that, in some embodiments, merchant devices 102a, 102b, 102c, web server 110, proxy email server 112, and transaction server 114 may respectively comprise one or more separate devices associates with a same or related entity. Moreover, while web server 110, proxy email server 112, and transaction server 114 are described as separate devices, is some cases, functionality of one or more of web server 110, proxy email server 112, and transaction server 114 may be combined into one or more devices.

Figure 2:
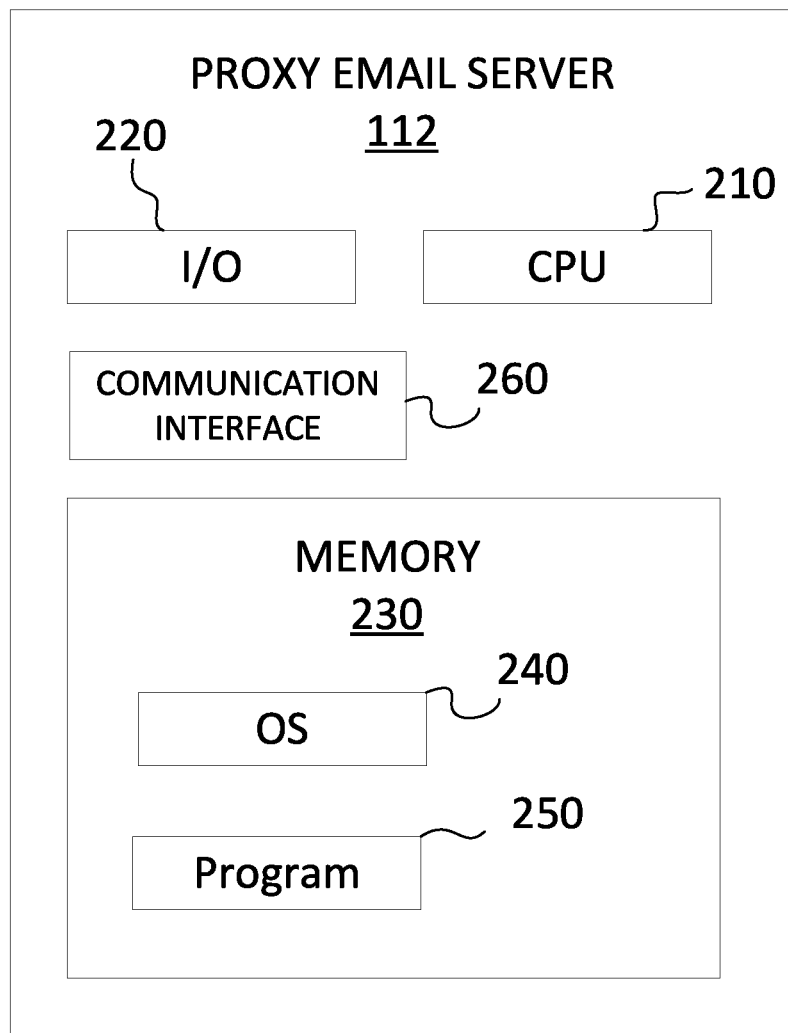
FIG. 2 is a component diagram of an exemplary proxy email server.

FIG. 2 shows a component diagram of an exemplary email server 112 configured for use in the herein-described systems and methods for managing transaction authorization. As shown, email server 112 may include a processor 210 ("CPU"), an input/output ("I/O") device 220, a memory 230 containing an operating system ("OS") 240, a program 250, and communication interface 260. For example, email server 112 may be a single server or may be configured as part of a distributed computer system including multiple servers or computers that interoperate to perform one or more of the processes and functionalities associated with the disclosed embodiments. In some embodiments, email server 112 may further include a display (or a display interface), a peripheral interface, a transceiver, a mobile network interface in communication with the processor 210, a bus configured to facilitate communication between the various components of email server 112, and a power source configured to power one or more components of email server 112.

A mobile network interface of email server 112 may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source of financial services device 110 may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some embodiments, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In some embodiments, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow financial services device 110 to execute multiple processes simultaneously. One of ordinary skill in the art would understand that other types of processor arrangements could be implemented that provide for the capabilities disclosed herein.

Proxy email server 112 may include one or more storage devices configured to store information (e.g., computer code) used by processor 210 (or other components) to perform certain functions related to the disclosed embodiments. In some embodiments, email server 112 may include memory 230 that includes instructions to enable processor 210 to execute computer code, such as server applications, network communication processes, and any other type of application or software known to be available on computer systems. For instance, in some embodiments, memory 230 may store computer program code comprising data mining algorithms, natural language processing, or text analytics. Such computer program code, when executed by processor 210, may enable processor to identify receipt information and/or account-holder information. In other embodiments, memory 230 may store computer program code comprising machine learning algorithms for identifying one or more patterns observed in emails containing receipt information. For instance, the processor may execute the machine learning algorithms to determine if an email includes general receipt information by identifying a general receipt layout or based on one or more receipt context clues, as discussed above. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, email server 112 includes memory 230 that includes instructions that, when executed by processor 210, perform one or more processes consistent with the functionalities disclosed herein. Systems and methods consistent with disclosed embodiments are not limited to separate programs or computers configured to perform dedicated tasks. For example, network terminal 110 may include memory 230 that may include one or more programs 250 to perform one or more functions of the disclosed embodiments. Moreover, processor 210 may execute one or more programs 250 located remotely.

Memory 230 may include one or more memory devices that store data and computer program code used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Email server 112 may also be communicatively connected to one or more memory devices (e.g., databases (not shown)) locally or through a network. The remote memory devices may be configured to store information and may be accessed and/or managed by email server 112. By way of example, the remote memory devices may be document management systems, Microsoft SQL databases, SharePoint databases, Oracle™ databases, Sybase™ databases, or other relational databases. Systems and methods consistent with disclosed embodiments, however, are not limited to separate databases or even to the use of a database.

Email server 112 may also include one or more I/O devices 220 that can comprise one or more interfaces for receiving signals or input from devices and providing signals or output to one or more devices that allow data to be received and/or transmitted by email server 112. In exemplary embodiments of the disclosed technology, email server 112 may include any number of hardware and/or software applications that are executed to facilitate any of the operations.

In some embodiments, proxy email server 112 may communicate with one or more of merchant devices 102a, 102b, 102c, web server 110, and transaction server 114 using communication interface 260.

In some embodiments, email server 112 may be associated with a domain, and emails received from one or more of merchant devices 102a, 102b, 102c may be directed to the domain. In some embodiments, the domain may be owned or operated by a third-party organization to which a user has an account and the proxy email address is not a user's personal, work, or primary email address. For instance, in some embodiments, the organization may be a financial services institution and the user may have a bank account with the financial services institution.

In some embodiments, proxy email server 112 may support a single email box (e.g., email address) associated with the domain. Therefore, proxy email server 112 may receive emails from one or more of merchant devices 102a, 102b, 102c directed to a single proxy email address for a plurality of account-holders. For instance, each account-holder associated with an organization may use the same proxy email address when making purchases, and proxy email server 112 may receive, at the same mail box, emails associated with each account-holder. In other embodiments, proxy email server 112 may support multiple email boxes (e.g., email addresses) associated with the domain. For instance, individual account-holders may each have an individualized proxy email address or sub-groups of account-holders associated with an organization may use the same proxy email address when making purchases. Thus, proxy email server 112 may receive emails at different mail boxes associated with one or more account-holders.

In some embodiments, processor 210 may execute computer program code stored on memory 230 to parse data indicative of an email for receipt information and purchaser information. Receipt information may include one or more of a merchant name, a transaction time, a total transaction amount, one or more product names, one or more product quantities, one or more product prices, and tax information. For instance, the computer program code may control the at least one processor 210 to parse the data indicative of the email to identify, as the receipt information, one or more receipt context clues (e.g., words "Total," "Tax," "Sub-total", or concepts such as delivery address and payment account). Account-holder information may include one or more of an address, a name, a card number, or a phone number associated with a purchaser (e.g., an account-holder of the plurality of account holders). For instance, the computer program code may control the at least one processor 210 to parse the data indicative of the email to identify, as the purchaser information, an account-holder's name.

Upon identifying receipt information and purchaser information, the computer program code may further control the processor 210 to extract one or more receipt line items from the data indicative of the email. The one or more receipt line items may correspond to a first purchase and comprise a product name, a product quantity, and a product price. In some embodiments, the computer code may further control the at least one processor 210 to determine, from within the receipt information, a receipt total representative of a total amount spent associated with the first purchase. For instance, the receipt total may be determined using one or more context clues, such that the processor determines that the total amount spent is associated with the word "Total." In some embodiments, the total amount spent may be the total of the receipt or a sub-total of the receipt line items before tax. Upon determining the receipt total, the computer program code may further control the at least one processor 210 to verify the one or more receipt line items by comparing an aggregate price of the one or more receipt line items with the receipt total. For instance, the computer program code may further control the at least one processor 210 to sum the product price for each of the receipt line items with the tax. In some embodiments, where the at least one processor 210 fails to identify receipt information within an email, the computer program code may further control the processor 210 to discard the email.

In some embodiments, processor 210 may execute computer program code stored on memory 230 to send a query request to transaction server 114. The query request may ask transaction server 114 if the receipt information matches a transaction stored on transaction server 114. In some embodiments, the query request may also comprise the receipt information identified from the data indicative of the email, such as an account-number, a time stamp, or a merchant name. In some embodiments, the query request may comprise account-holder information such as a name or address of the purchaser. In some embodiments, processor 210 may receive an answer to the query request from transaction server 114 indicating that the receipt information matches a transaction stored on transaction server 114 and corresponds to a particular account-holder. The processor 210 may then send a forward email to a primary email address associated with the particular account-holder. The forward email can comprise the data indicative of the first email. In other embodiments, the processor 210 may receive an answer to the query request from transaction server 114 indicating that the receipt information does not match a transaction stored on transaction server 114. The processor 210 may then discard the email. This may occur, for instance, if the purchaser enters the proxy email address but is not an account-holder, the purchase is cancelled, or an account-holder does not use a credit card associated with the account to make a purchase. In some embodiments, even if it is determined that the receipt information does not match a transaction stored on transaction server 114, processor 210 may identify an account-holder who made the purchase. For instance, processor 210 may parse the email for purchaser information including but not limited to a name or address of the account-holder. In some embodiments, processor 210 may then forward the email to a primary email address of the account-holder. Furthermore, processor 210 may store the receipt information in association with the account-holder, and attach the receipt information to a later-stored transaction of the account-holder on transaction server 114.

In some embodiments, once processor 210 receives an answer to the query request from transaction server 114 indicating that the receipt information matches a transaction stored on transaction server 114, the processor 210 may generate a new email message including the receipt information. For instance, the generated new email message may be based on a standard template including the receipt information to assist customers with identifying, soring, or analyzing receipts and receipt information.

While email server 112 has been described as one form for implementing the techniques described herein, persons having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of email server 112 may include a greater or lesser number of components than those illustrated.

Figure 3:
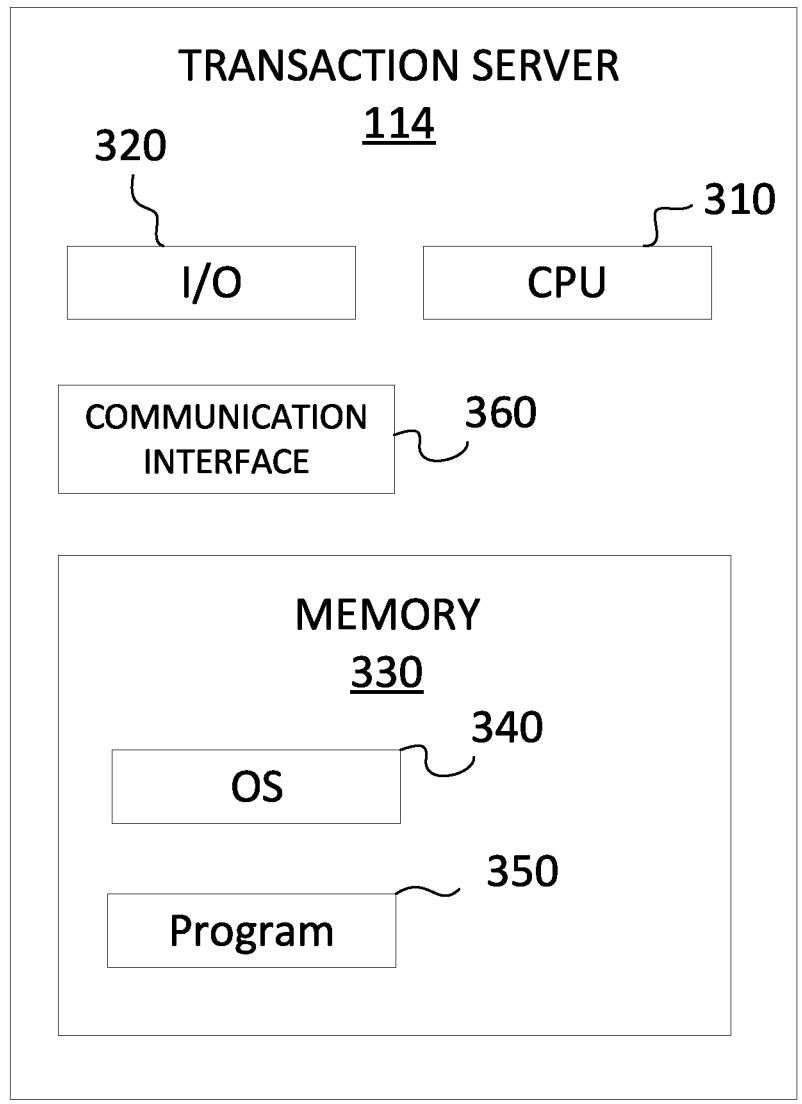
FIG. 3 is a component diagram of an exemplary transaction server.

FIG. 3 shows a component diagram of an exemplary transaction server 112 configured for use in the herein-described systems and methods for managing transaction authorization. As shown, transaction server 114 may include a processor 310 ("CPU"), an input/output ("I/O") device 320, a memory 330 containing an operating system ("OS") 340, a program 350, and communication interface 360. Transaction server 114 may include some or all of the features of email server 112.

In some embodiments, processor 310 may execute computer program code stored on memory 330 to receive transaction data associated with a plurality of transactions from a plurality of accounts. For instance, when an account-holder makes a purchase at a merchant, the transaction server may receive transaction data associated with the purchase. The transaction data may comprise an account number, a merchant code, a time-stamp, and a purchase amount. In some embodiments, the transaction server may receive the transaction data at communication interface 360 and store the transaction data on memory 330 on an external database.

In some embodiments, processor 310 may execute computer program code stored on memory 330 to receive a query request from proxy email server 112, the query request comprising receipt information associated with a first purchase made at a first merchant. The query request may ask transaction server 114 to determine if the attached receipt information corresponds to a transaction stored on transaction server 114. In some embodiments, processor 310 may execute computer program code stored on memory 330 to conduct an initial comparison of the transaction data to the receipt data to identify a first transaction among the plurality of transactions corresponding to the first purchase. In some embodiments, the initial comparison may comprise a search of the transaction data for a matching first transaction based on one or more comparison terms. The comparison terms may comprise one or more of a merchant code, a merchant name, a timestamp, an account number, the last four digits of an account number, or device information (e.g., an IP address). For instance, in some embodiments, the initial comparison may comprise a search of the transaction data for one or more transactions with a merchant code and a timestamp corresponding to a merchant name and a transaction time identified from the receipt data. A narrowing down to a matching transaction may occur by further comparing, for example, a purchasing account or an account amount. In some cases, the initial comparison may comprise a search of the transaction data for a time stamp, an account number, and a merchant name identified from the receipt information.

In some embodiments, if a matching transaction is not identified from the initial comparison, processor 310 may execute computer program code stored on memory 330 to conduct an updated comparison of the transaction data to the receipt information. For instance, the transaction server may receive an update to the transaction data comprising the matching transaction (e.g., in substantial real-time to purchases being made or asynchronously). The transaction server 114 may attempt to match the receipt information to a transaction based on updated transaction data for a predetermined time (e.g., 3 days or 3 business days) or for a time designated in the query request from proxy email server 112.

In some embodiments, processor 310 may execute computer program code stored on memory 330 to attach (e.g., store in association with) receipt information of the first purchase to the identified first transaction. In some embodiments, where the receipt information comprises a plurality of receipt line items, processor 310 may execute computer code stored on memory 330 to separate each line item from the plurality of line items received from the email server and store each line item as a separately identifiable and/or searchable entry and in connection with the identified transaction. For instance, by storing each line item as a separately identifiable entry, if an account-holder looks at her transaction history, the line items may be viewable in an expandable window. Similarly, this provides the enhanced ability to search for transactions by item and item cost, rather than merely merchant, date, and total cost.

In some embodiments, processor 310 may execute computer program code stored on memory 330 to output for transmission a notification to proxy email server 112 indicating whether a matching transaction could be found.

In some embodiments, processor 310 may execute computer program code stored on memory 330 to receive image data representative of an email corresponding to a transaction and store the image data in connection with the identified transaction. In some embodiments, the image data may correspond to an image of an electronic receipt corresponding to the transaction.

Figure 4:
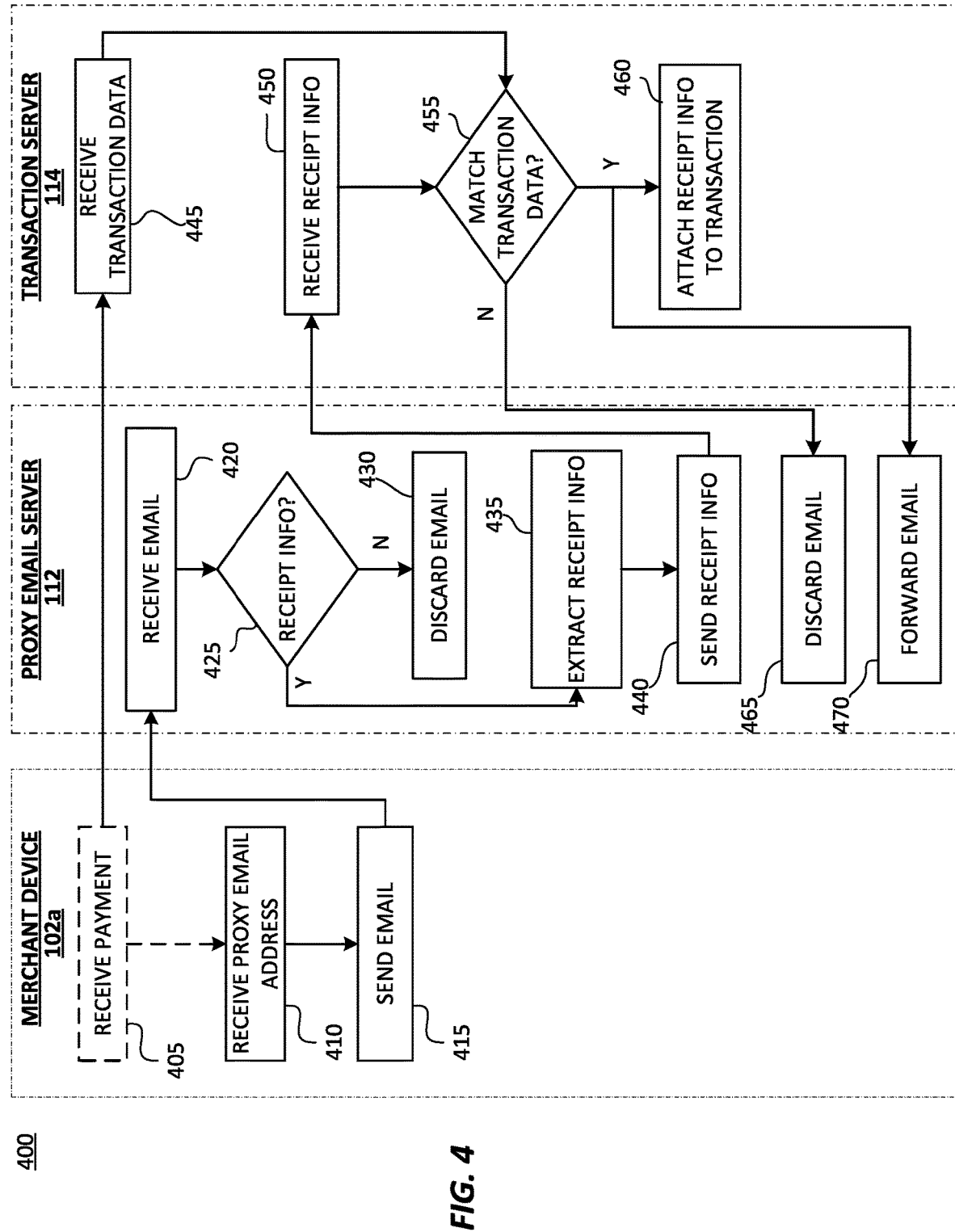
FIG. 4 is a diagram of an exemplary environment that may be used for custodial email management and transaction verification between a merchant device, a proxy email server, and a transaction server.

FIG. 4 shows a flow diagram 400 in an example system environment that may be used for custodial email management between one or more of merchant devices 102a, 102b, 102c, a proxy email server 112, and a transaction server 114. At block 405, one or more of merchant devices 102a, 102b, 102c (e.g., merchant device 102a, which will be used for example purposes hereafter) may receive a payment from a user for a first purchase. As described previously, in some embodiments, merchant device 102a may be a mobile point-of-sale terminal and receive payment from the account-holder. Upon receiving payment, merchant device 102a may send, either directly or through a payment processing network, transaction data to transaction server 114 detailing certain aspects of the transaction, such as transaction amount, transaction time, merchant identification, and account number. At block 445, transaction server 114 may receive the transaction data and store the transaction data.

In completing the first purchase, merchant device 102a may prompt a user to enter an email address. The email address may be received before or after processing the payment according to particular implementations. In some embodiments, merchant device 102a may receive the email address when a user logs into an account associated with the merchant. In some embodiments, merchant device 102a may prompt user for an email address to send a receipt associated with a purchase. At block 410, merchant device 102a may receive a proxy email address input from the user. In some embodiments, the user may manually enter the proxy email address. In other embodiments, as described previously, the proxy email address may be automatically entered by the merchant device (e.g., upon recognizing the purchaser is associated with transaction server 114). At block 415, responsive to receiving entry of the proxy email address, merchant device 102a may send an email comprising an electronic receipt to proxy email server 112. In some embodiments, merchant device 102a may send an email 415 that does not comprise an electronic receipt, such as marketing or promotional materials or junk email.

At block 420, proxy email server 112 may receive the email from merchant device 102a. As explained above, the email may comprise receipt information or may not comprise receipt information. At block 425, proxy email server 112 determines whether the email comprises receipt information. For instance, in some embodiments, proxy email server 112 may parse the data indicative of the first email for receipt information. Receipt information may include one or more of a merchant name, a transaction time, a total transaction amount, one or more product names, one or more product quantities, one or more product prices, and tax information. At block 430, if receipt information is not identified, proxy email server 112 may discard the email. At block 435, if receipt information is identified, proxy email server 112 may extract receipt information from the email data. For instance, proxy email server 112 may extract one or more receipt line items.

At block 440, upon extracting receipt information, proxy email server 112 may send the receipt information to transaction server 114. In some embodiments, the receipt information may be sent to transaction server 114 as part of a query request asking transaction server 114 if transaction server has stored transaction data corresponding to the receipt information. At block 450, transaction server 114 may receive the receipt information. At block 455, transaction server 114 may determine if the receipt information matches transaction data. In some embodiments, transaction server 114 may conduct an initial comparison of the transaction data to the receipt data to identify a transaction corresponding to the receipt data. At block 460, if the transaction server does identify a matching transaction, the transaction server may attach the receipt information to the corresponding transaction (e.g., store the receipt data in association with transaction data of the identified matching transaction). At block 470, if the receipt information matches a transaction, transaction server 114 may notify proxy email server 112, and proxy email server can forward the email to a primary address associated with the account-holder. If, at block 455, the transaction server 114 does not identify a matching transaction, the transaction server may notify proxy email server 112 and at block 465, proxy email server 112 may discard the email. In some embodiments, however, if the receipt information is confirmed, proxy email server 112 may forward the email to the identified account-holder even if no matching transaction is found.

Figure 5:
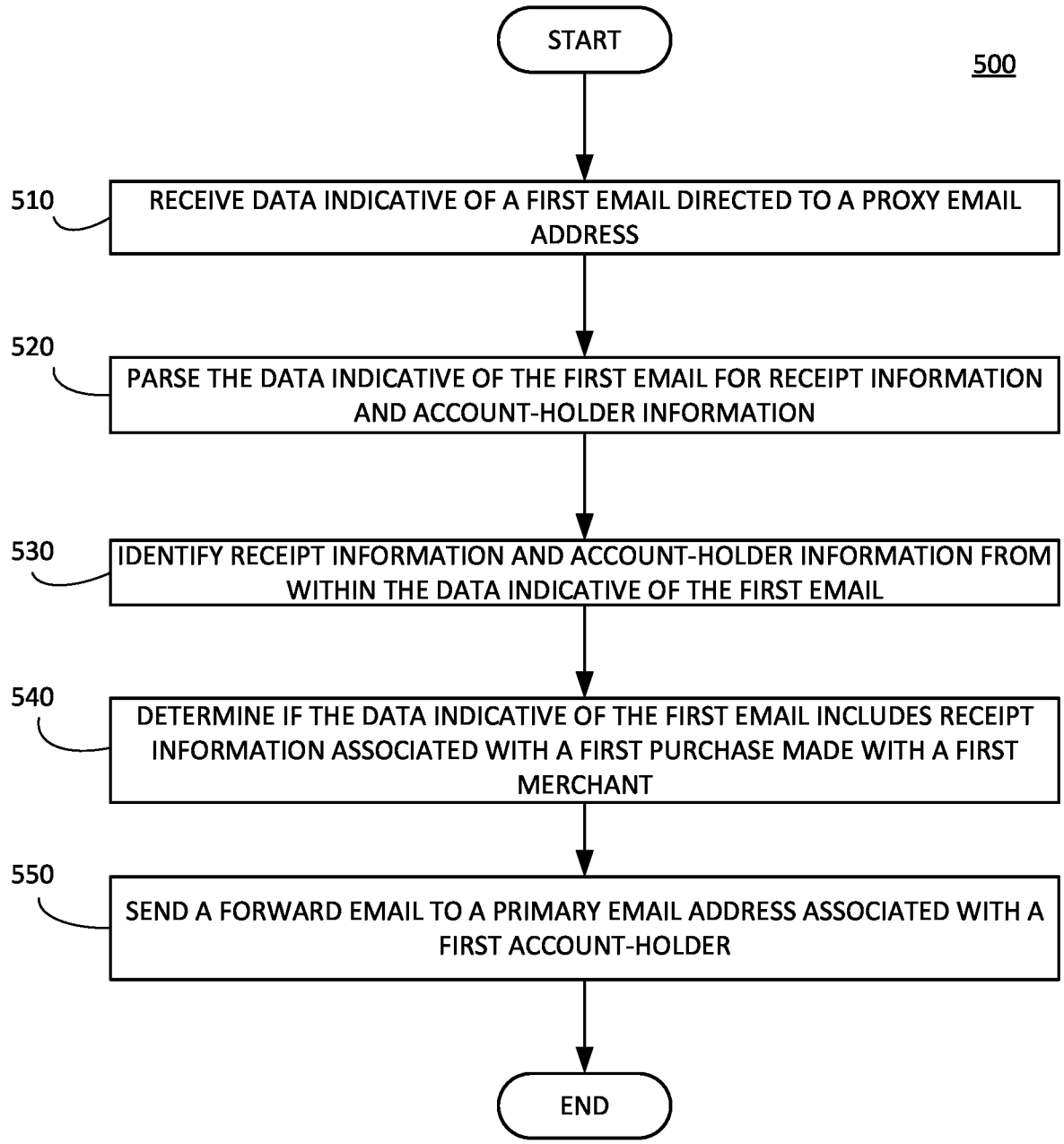
FIG. 5 is a flowchart of an exemplary method for custodial email management and transaction verification.

FIG. 5 is a flowchart of an exemplary method 500 for custodial email management and transaction verification. Method 500 may be performed by proxy email server 112 using processor 210 to execute memory 230.

At block 510, proxy email server 112 receives data indicative of a first email directed to a proxy email address. For instance, the data indicative of a first email may be received by merchant device 102a. At block 520, responsive to receiving the data indicative of the first email, proxy email server 112 parses the data indicative of the first email for receipt information and account-holder information to determine whether the email contains receipt information and should be forwarded to an account-holder or contains non-receipt information and should be deleted. For instance, proxy email server 112 may analyze the first email to determine if the first email includes an electronic receipt documenting a purchase made by the account-holder with a merchant. At block 530, once proxy email server 112 determines that the first email contains receipt information, proxy email server 112 identifies the receipt information based on the parsing, and, in some cases, may identify account-holder information from within the data indicative of the first email. At block 540, using the identified receipt information and optionally the account-holder information, the proxy email server 112 determines if the data indicative of the first email includes receipt information associated with a first purchase made with a first merchant by an account-holder. For instance, proxy email server 112 may query a transaction server 114 to determine if transaction server has stored a matching purchase to that documented in the first email. At block 550, responsive to determining that the data indicative of the first email includes receipt information associated with the first purchase, proxy email server 112 may send a forward email to a primary email address associated with the account-holder, the forward email including the receipt information. In some cases, the forward email may be a copy of the first email. In some instances, the forward email may include an image of the first email. In some implementations, the forward email may include the receipt information in a predetermined format. For example, the account-holder could specify a format for receiving receipt information, and proxy email server 112 may generate a forward email including the receipt information in the specified format.

Figure 6:
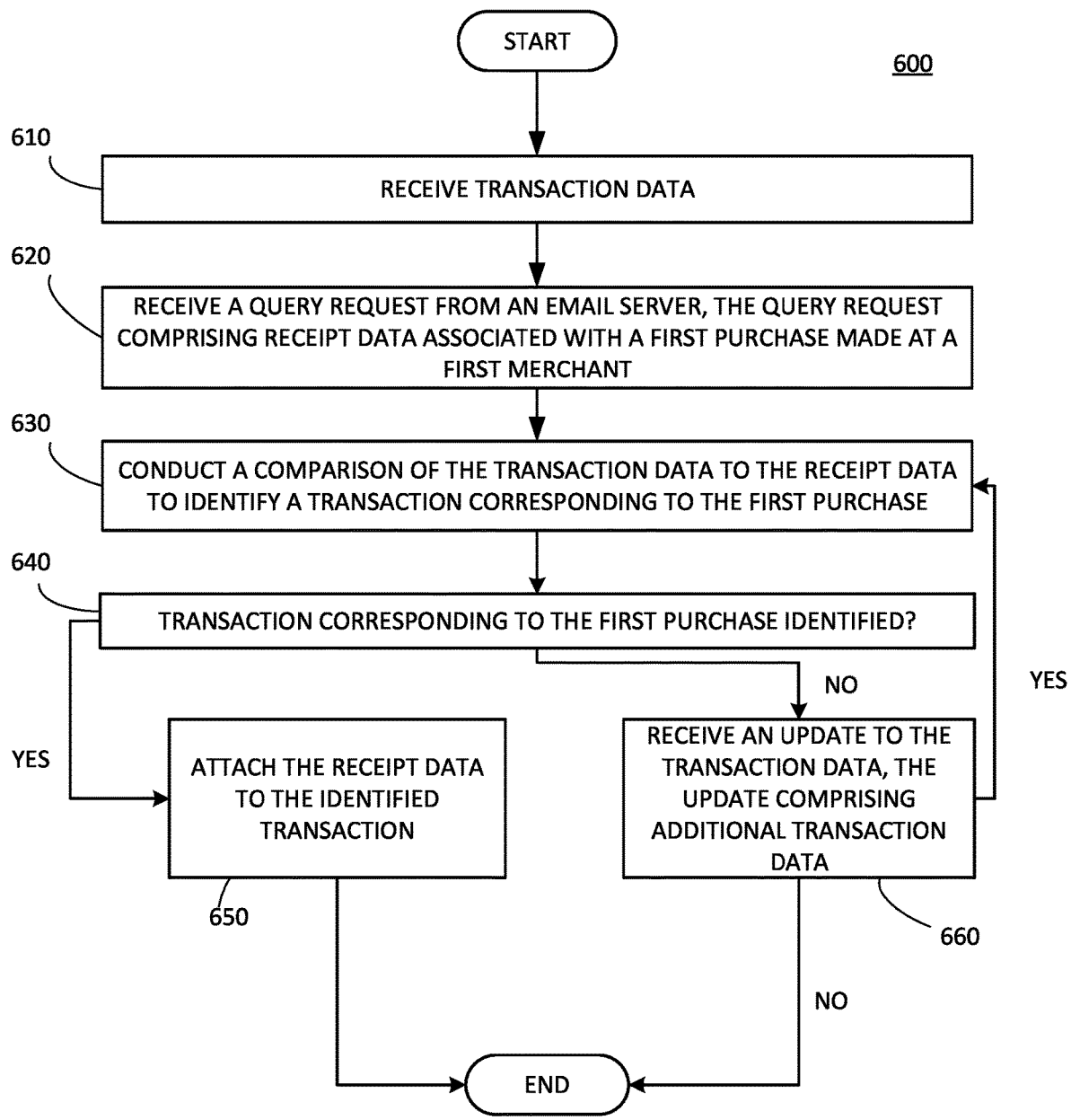
FIG. 6 is a flowchart of another exemplary method for custodial email management and transaction verification.

FIG. 6 is a flowchart of an exemplary method 600 for custodial email management and transaction verification.

Method 600 may be performed by transaction server 114 using processor 310 to execute memory 330.

At block 610, transaction server 114 may receive transaction data. At block 620, transaction server may receive a query request from an email server, the query request may include receipt data associated with a first purchase made at a first merchant. At block 630, transaction server conducts an initial comparison of the transaction data to the receipt data to identify a transaction corresponding to the first purchase. At block 640, transaction server 114 determines if a transaction corresponding to the first purchase has been identified based on the receipt data. If a transaction has been identified (640—YES), transaction sever 114 will, at block 650, attach the receipt data to the identified transaction. If a transaction has not been identified (640—NO), transaction server 114 may wait a predetermined period of time during which transaction server 114 may, at block 660, receive an update to the transaction data, the update comprising additional transaction data. Transaction server 114 may then again conduct another comparison of the additional transaction data to the receipt data at block 630 to identify a transaction corresponding to the first purchase at block 640. If transaction server 114, does not identify a transaction corresponding to the first purchase based on the receipt data within a predetermined amount of time (e.g., 2 days from receipt of the query request), transaction server may end the process without attaching the receipt information to an identified transaction (660—NO).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. It is intended solely for explanatory purposes and not limitation. An account-holder "AH" may have an account with the financial institution "FI" and be provided an assigned static email address (e.g., a proxy email address) "receipts@financialinstitution.com" received when setting up her account. An email server associated with FI may receive emails sent to "receipts@financialinstitution.com."

The email server associated may simultaneously receive emails from a plurality of merchants associated with various account-holders of the financial institution as the account-holders make purchases. For example, the email inbox associated with the assigned static email address (receipts@financialinstitution.com) can receive emails from a variety of merchants associated with purchases made by a variety of account-holders. Additionally, the email inbox associated with the assigned static email address may also be receiving different types of emails from merchants (e.g., some e-mails that contain receipts and other e-mails contain advertisements/promotional materials).

The email server may attempt to identify emails having receipt information from among the plurality of emails. For instance, the email server may parse each email for receipt information to determine if the email contains a receipt. For example, the email server may parse each email for the words "Tax" or "Total." After determining that the email contains receipt information, the email server may identify product names, product quantities, and prices of each receipt line item. Following, the email server may query a transaction server to find a matching transaction and send the receipt information to the transaction server. The receipt information sent may comprise the one or more receipt line items, account-holder information, a time associated with the receipt, the last four digits of an account number, and/or a total receipt amount.

The transaction server may store information about all transactions made by account-holders made at various merchants on a transaction database. The transaction database may store transaction data associated with the transactions, including, but not limited to, account numbers, transaction amounts, merchant codes, and timestamps. Upon receiving the receipt information from email server, transaction server may search the transaction database for a matching transaction. Transaction server may search transaction database based on the received receipt information. For instance, transaction server may conduct a Boolean search based on the receipt total, the last four digits of the account number, and a time stamp. Once the transaction server identifies a corresponding transaction, the transaction server may attach the receipt information to the corresponding transaction (e.g., as one or more line items) such that when the account-holder views her transaction history in an internet browser or mobile application, she will be presented with an expandable window that displays each item purchased and the amount paid.

AH may purchase a dress and a belt at a Zara brick-and-mortar store. The dress may cost $80, the belt may cost $20, and the total purchase price may be $105 with tax. Zara may utilize a POS device, such as a Square Register (e.g., one or more of merchant devices 102a, 102b, 102c), which prompts her to enter an email address to receive a receipt. Instead of entering her personal email address, AH enters the "receipts@financialinstitution.com" address and the POS device sends an electronic receipt email to the email server associated with financial institution and sends transaction information to transaction server. The email server receive AH's receipt from Zara and parses the email received for receipt information. Finding that the email includes receipt information, the email server extracts receipt information from the email and sends it to the transaction server. The receipt information may include one or more of identification of Zara, AH's name, a purchase time, the last four digits of a purchasing account, the total amount, and one or more line items.

Transaction server receives the receipt information, and matches the receipt information to the corresponding transaction. Transaction server notified email server of the match, which then forwards the receipt information to AH. In some cases, transaction server stores the receipt information associated with the transaction. Thus, when AH looks at her transaction history, she can see individual items, including the individual dress and belt purchased from Zara, instead of just a date and total.

In another case, the AH may attempt to purchase items from Zara.com. AH's computer browser may have an add-on that recognizes when account-holder is using a payment method associated with financial services institution. When account-holder enters her payment information, subsequent pages requesting her email address may be automatically filled-in with the receipts@financialinstitution.com email address.

In another case, the account-holder may manually enter the receipts@financialinstitution.com email address when prompted on the Zara.com payment portal.

What is claimed is:

1. A method comprising:
receiving, from a first merchant, a first message directed to a single proxy address, the single proxy address associated with all account-holders affiliated with an organization, the first message comprising transaction information;
comparing the transaction information to an account-holder database to identify account-holder information for a first account-holder of the account-holders affiliated with the organization, the account-holder information including a primary address;
sending a forward message to the primary address, the forward message comprising the transaction information from the first messages;
receiving, from the first merchant, data indicative of a second message directed to the single proxy address;
determining that the second message does not include the transaction information by parsing the data indicative of the second message for the transaction information; and
discarding the data indicative of the second message.

2. The method of claim 1, further comprising:
receiving a plurality of messages from a plurality of merchants, each of the plurality of messages being intended for a respective account-holder of the account-holders affiliated with the organization.

3. The method of claim 1, further comprising:
sending the transaction information to a transaction server, the transaction server storing transaction data associated with a plurality of transactions corresponding to a plurality of purchases and configured to store the transaction information in association with a first transaction of the plurality of transactions corresponding to a first purchase.

4. The method of claim 1, further comprising:
parsing data indicative of the first message to identify, as the transaction information, one or more of a merchant name, a merchant code, a transaction time and date, a total transaction amount, a subtotal amount, discounts provided, a shipping and handling cost, one or more product names, one or more product descriptions, one or more product sizes, one or more product customizations, one or more product quantities, one or more product prices, one or more services rendered, a gratuity, and tax information.

5. The method of claim 1, further comprising:
parsing data indicative of the first message to identify, as the account-holder information, one or more of an address, a name, a card number, a partial card number, an expiration date for a card, a security code, an account number, a rewards or loyalty program number, or a phone number associated with an account-holder of the account-holders affiliated with the organization.

6. The method of claim 1, further comprising:
determining, from within the transaction information, one or more line items associated with a first purchase, the one or more line items comprising a service rendered, a product name, a product quantity, and a product price;
determining, from within the transaction information, an overall total representative of a total amount spent associated with the first purchase; and
verifying the one or more line items by comparing an aggregate price of the one or more line items with the overall total.

7. The method of claim 1, further comprising:
discarding the first message responsive to determining that a first transaction associated with the transaction information was canceled or that the first transaction was not purchased with a credit card associated with the first account-holder.

8. The method of claim 1, wherein:
the first and second messages comprise emails,
the single proxy address comprises a proxy email address, and
the transaction information comprises receipt information.

9. A method comprising:
receiving transaction data associated with a plurality of transactions from a plurality of accounts;
receiving a query request from a server, the query request comprising first transaction data associated with a first purchase made at a first merchant;
identifying whether a first transaction among the plurality of transactions corresponds to the first purchase;
in response to failing to identify whether the first transaction among the plurality of transactions corresponds to the first purchase, receiving updated transaction data and comparing the updated transaction data to the first transaction data to identify the first transaction corresponding to the first purchase;
in response to identifying the first transaction among the plurality of transactions corresponds to the first purchase based on comparing the updated transaction data, attaching the first transaction data to the first transaction; and
in response to failing to identify whether the first transaction among the plurality of transactions corresponds to the first purchase after a predetermined number of comparisons to further update the transaction data, discarding the first transaction data.

10. The method of claim 9, wherein the first transaction data associated with the first purchase comprises a plurality of line items.

11. The method of claim 10, further comprising:
separating each line item from the plurality of line items received from the server; and
storing each line item as a separately identifiable entry and in connection with the first transaction of the plurality of transactions.

12. The method of claim 9, further comprising:
determining whether the first transaction matches a first portion of the first transaction data; and
responsive to determining the first transaction matches the first portion of the first transaction data, determining whether the first transaction further matches a second portion of the first transaction data.

13. The method of claim 9, further comprising:
in response to failing to identify whether the first transaction among the plurality of transactions corresponds to the first purchase after the predetermined number of comparisons to further update the transaction data, transmitting a notification to the server indicating that the first transaction could not be found.

14. The method of claim 9, further comprising:
receiving image data representative of a first message corresponding to the first transaction; and
storing the image data in connection with the first transaction.

15. The method of claim 9, further comprising:
determining, from the first transaction data, one or more of a merchant name, a merchant address, a transaction time and date, and a total transaction amount; and
identifying the first transaction among the plurality of transactions corresponds to the first purchase by matching one or more of a merchant code, a time-stamp, and a total transaction amount corresponding to the first transaction with one or more of the merchant name, the merchant address, the transaction time and date, and the total transaction amount from the first transaction data.

16. A method comprising:
receiving, from a first merchant, a first message comprising transaction information addressed to a proxy address, the proxy address corresponding to a first account-holder;
determining whether the transaction information corresponds to a first transaction of a plurality of transactions of the first account-holder by transmitting the transaction information to a transaction server storing transaction data associated with the plurality of transactions of the first account-holder;
in response to determining that the transaction information corresponds to the first transaction of the plurality of transactions, forwarding the first message to a primary address associated with the first account-holder; and
in response to receiving a notification from the transaction server indicating that whether the first transaction of the plurality of transactions corresponds to the transaction information was not identified, discarding the first message.

17. The method of claim 16, further comprising:
identifying one or more line items associated with the transaction information; and
sending the one or more line items to a transaction server, the transaction server storing transaction data associated with the plurality of transactions and configured to store the one or more line items in association with the first transaction of the plurality of transactions corresponding to the transaction information.

18. The method of claim 17, further comprising:
determining whether the first message includes the transaction information by parsing the first message to identify one or more contextual clues corresponding to the transaction information.

19. The method of claim 16, further comprising:
responsive to determining that the first transaction was canceled or that the first transaction was not purchased with a credit card associated with the first account-holder, discarding the first message.

20. The method of claim 16, further comprising:
receiving, from the first merchant, data indicative of a second message directed to the proxy address;
determining that the second message does not include the transaction information by parsing the data indicative of the second message for the transaction information; and
discarding the data indicative of the second message.

* * * * *